(12) United States Patent
Pande et al.

(10) Patent No.: US 11,941,350 B2
(45) Date of Patent: *Mar. 26, 2024

(54) SYSTEMS AND METHODS FOR CONVERSION OF DOCUMENTS TO REUSABLE CONTENT TYPES

(71) Applicant: OPEN TEXT HOLDINGS, INC., Menlo Park, CA (US)

(72) Inventors: Vaibhav Pradip Pande, Amravati (IN); Paritosh Tomar, Hyderabad (IN)

(73) Assignee: Open Text Holdings, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,538

(22) Filed: Feb. 15, 2023

(65) Prior Publication Data

US 2023/0196004 A1    Jun. 22, 2023

Related U.S. Application Data

(63) Continuation of application No. 17/706,705, filed on Mar. 29, 2022, now Pat. No. 11,620,440, which is a continuation of application No. 17/191,478, filed on Mar. 3, 2021, now Pat. No. 11,321,517.

(51) Int. Cl.
| | | |
|---|---|---|
| *G06K 9/46* | (2006.01) | |
| *G06F 40/166* | (2020.01) | |
| *G06F 40/205* | (2020.01) | |

(52) U.S. Cl.
CPC .......... *G06F 40/166* (2020.01); *G06F 40/205* (2020.01)

(58) Field of Classification Search
CPC .... G06F 40/166; G06F 40/205; G06F 40/131; G06F 40/221; G06F 40/27
See application file for complete search history.

(56) References Cited

U.S. PATENT DOCUMENTS

| | | | |
|---|---|---|---|
| 10,866,980 B2 * | 12/2020 | Rogynskyy | G06Q 10/04 |
| 2013/0036108 A1 * | 2/2013 | Corbeau | G06F 16/958 |
| | | | 707/769 |
| 2017/0236302 A1 * | 8/2017 | Arth | G06F 16/783 |
| | | | 382/103 |
| 2018/0204111 A1 * | 7/2018 | Zadeh | G06V 10/764 |
| 2019/0361934 A1 * | 11/2019 | Rogynskyy | G06F 16/26 |
| 2021/0329441 A1 * | 10/2021 | Andrews | G06V 10/764 |

* cited by examiner

*Primary Examiner* — Hassan Mrabi
(74) *Attorney, Agent, or Firm* — Sprinkle IP Law Group

(57) ABSTRACT

Embodiments of systems and methods for the conversion of documents to reusable content types are disclosed herein. Embodiments may extract the content and metadata of the original document and identify a set of reusable resources from the content and metadata. These reusable resources can each be one of a set of content types common across a plurality of document authoring platforms. Each of the content types may be represented using a content type object associated with that content type. The reusable resources identified by the parsing of the content and metadata of the original document may thus be represented with corresponding reusable objects in a content type format common to a plurality of document authoring tools.

21 Claims, 13 Drawing Sheets

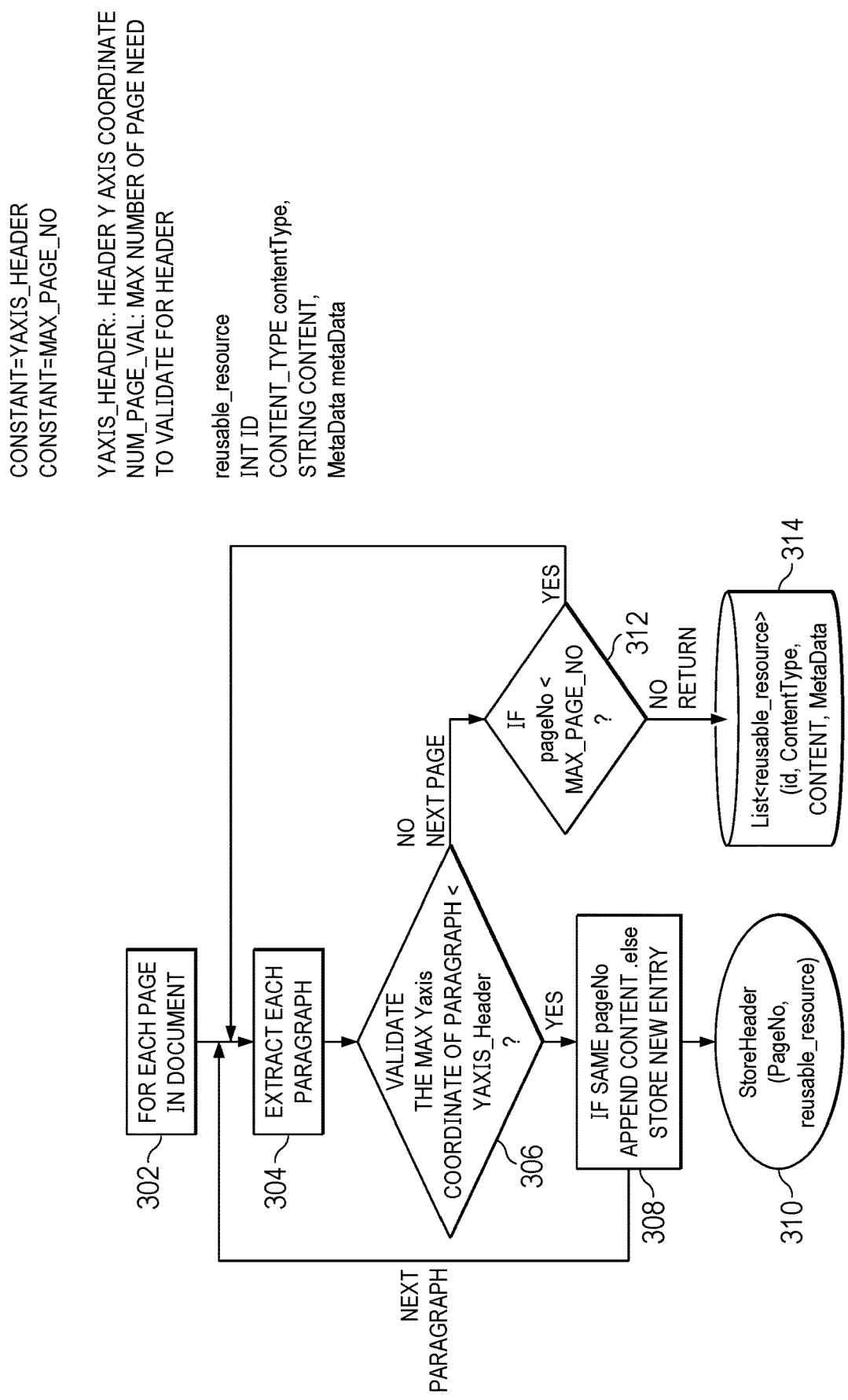

PDF EXTRACTED CONTENT

| CONTENT TYPE | |
|---|---|
| CHART: SUMMARY OF ASSET ALLOCATION | |
| KEY | VALUE |
| CASH AND EQUIVALENTS | 10 |
| ALTERNATIVE INVESTMENTS | 20 |
| EQUITY | 60 |
| FIXED INCOME | 20 |
| TABLE: SUMMARY OF ASSET ALLOCATION | |
| KEY | VALUE |
| (0,0) | - |
| (0,1) | HOLDINGS AT MDPIC MARKET VALUE |
| (0,2) | PERCENT OF PORTFOLIO |
| (1,0) | CASH AND EQUIVALENTS |
| (1,1) | 32546.1 |
| (1,2) | 4.77 |
| (2,0) | FIXED INCOME |
| (2,1) | 266844.48 |
| (2,2) | 39.12 |
| (3,0) | EQUITY |
| (3,1) | 382,712.41 |
| (3,2) | 56.11 |
| (4,0) | ALTERNATIVE INVESTMENTS |
| (4,1) | - |
| (4,2) | - |
| (5,0) | TOTAL MDPIC HOLDINGS |
| (5,1) | 682,103.00 |
| (5,2) | 100.00 |
| TABLE: SUMMARY OF ACCOUNT VALUES | |
| KEY | VALUE |
| (0,0) | ACCOUNT NAME |
| (0,1) | ACCOUNT NUMBER |
| (0,2) | ACCOUNT VALUE |
| (1,0) | IPP DR. JOHN SAMPLE |
| (1,1) | 1234567NT |
| (1,2) | 682,103.00 |
| (2,0) | TOTAL PORTFOLIO VALUE |
| (2,1) | |
| (2,2) | 682,103.00 |

SYSTEMS AND METHODS FOR CONVERSION OF DOCUMENTS TO REUSABLE CONTENT TYPES

CROSS-REFERENCE TO RELATED APPLICATION(S)

This application is a continuation of, and claims a benefit of priority under 35 U.S.C. 120 from, U.S. patent application Ser. No. 17/706,705, filed Mar. 29, 2022, issued as U.S. Pat. No. 11,620,440, entitled "SYSTEMS AND METHODS FOR CONVERSION OF DOCUMENTS TO REUSABLE CONTENT TYPES," which is a continuation of, and claims a benefit of priority under 35 U.S.C. 120 from, U.S. patent application Ser. No. 17/191,478, filed Mar. 3, 2021, issued as U.S. Pat. No. 11,321,517, entitled "SYSTEMS AND METHODS FOR CONVERSION OF DOCUMENTS TO REUSABLE CONTENT TYPES," both of which are fully incorporated by reference herein for all purposes.

TECHNICAL FIELD

This disclosure relates generally to the management, development, editing, deployment, and communication of content. More particularly, this disclosure relates to embodiments of systems and methods for content conversion. Even more specifically, this disclosure relates to embodiments of systems and methods for conversion of documents into content types reusable across document composition platforms.

BACKGROUND

Ever since the advent of the computer networks (including the Internet), enterprise environments have been steadily growing more complicated, encompassing an ever-expanding amount of increasingly complex digital assets (or just assets). A digital asset, in essence, is anything that exists in a binary format that may exist in the enterprise environment or otherwise be utilized by the enterprise. The digital assets of an enterprise may thus include a variety of digital content (content) including text, images, aural or video content, templates used in content delivery or other types of content. For purposes of this disclosure, the terms document and content will be used interchangeably with the term asset and understood to have the same definition as an asset.

In an enterprise environment, these assets may be widely distributed and used for a wide variety of purposes in association with that enterprise. To aid in managing and using their various assets, many enterprises have employed a number of content management systems, such as digital asset management (DAM) systems, content management systems (CMS), web content management (WCM) systems, enterprise content management (ECM) systems, etc.

These enterprises, or the users within such enterprises, may thus have a large number of document composition or authoring (used interchangeably) platforms. These document authoring platforms may range from simple word processing applications such as Microsoft Word or the like (which may be used with content management systems or the like), to proprietary document authoring tools (e.g., applications or interfaces that are provided by document authoring platforms, such as proprietary thin client (e.g., browser based) or thick client interfaces.

One example of such document authoring platforms are customer communications management software platforms. Specifically, the distribution of content across an enterprise in these various management systems, along with widespread and distributed use of such content, therefore, results in an extremely complex web of interconnectivity involving hundreds or sometimes thousands of systems or people.

Oftentimes enterprises (e.g., almost any profit or non-profit entity such as a service company, an insurance or utility company or another type of entity) wish to communicate with their customers or other entities with whom they wish to engage (e.g., distributors, partners, regulatory bodies, donators, etc.) via multiple communications channels. While the types of content management systems discussed above are useful in creating, versioning and controlling access to content, they do not provide a convenient mechanism to integrate such content in outbound communications across multiple channels.

To address the need for multi-channel communication, an enterprise may integrate a customer communication management (CCM) system. CCM systems can provide an enterprise with an application to improve outbound communications with their distributors, partners, regulatory bodies, customers or others. Such CCM systems may allow an enterprise to improve the creation, delivery, storage or retrieval of outbound communications, including communications used for marketing, new product introductions, renewal notifications, claims correspondence, documentation, bill statements, advertising, payment notifications, etc. These communications can occur through a number of output channels including email, Short Message Service (SMS), web pages, or mobile applications.

Oftentimes during the authoring of these communications then, users of these CCM system may desire to use portions of content from other documents (e.g., from previously generated communications for other purposes). While prevalent in the context of CCM systems, this desire is not confined to CCMs. Thus, the example of a user's desire to reuse content in the context of a CCM it but a microcosm of a more general desire in document authoring platforms. Namely, the desire to reuse content from documents in the authoring of other documents.

The reuse of the content of other documents is, however, not straight forward. Documents may not have been generated by the same document authoring platform and thus be in a different format. Accordingly, even if content could be extracted from these documents, it may not be in format that is consumable or other usable by the document authoring platform being utilized by a user. Additionally, there just may be no simple and straightforward way to extract certain types of content from documents generally, or to identify extracted content as a certain type of content.

What is desired therefore, are systems and methods for the extraction of multiple types of content of documents into a reusable format consumable across multiple document authoring platforms.

SUMMARY

To continue elaborating on the above referenced problems and desires, as discussed a user may wish to reuse some portion of content available in a document when authoring or composing another document. The original document may be in a particular document format such as a format utilized by a document authoring system or another type of format such as a print stream format including, for example, Portable Document Format (PDF) Advanced Function Printing (AFP), line data, metacode, Printer Command Language (PCL), Tag Image File Format (TIFF), etc.

Accordingly, even in cases where content of the document may be extracted, the extracted content is extracted solely as text or image fragments. There is no mechanism to extract contents based on their most relevant and matching content type. In other words, the content loses the context of what type of content to which that text or image belongs. Thus, the user is limited in their ability to utilize any extracted content and may not be able to use such extracted content in the manner in which it most relevant (e.g., may not be able to reuse the extracted content as the type of content it was in the original document, such as a document header and footers, email, subject or document title, date/time, signature, table, graph, chart, etc.).

What is desired, therefore is that content be extracted as a particular content type in a format associated with that content type that can be easily reused by a number of document authoring platforms and that may be common to those document authoring platforms.

To that end, embodiments of systems and methods for the conversion of documents to reusable content types are disclosed herein. Embodiments may receive an original document in a particular format, such as a print stream format (e.g., PDF) or the like and extract the content and metadata of the original document. This content and metadata may include, for example, the text or images included in the original document in addition to metadata identifying the location of the text or image. This location information may include X-axis or Y-axis coordinates on a character by character basis or, in some instances may include the identification of paragraphs of text along with such location information.

The content and metadata of the original document can be parsed to identify a set of reusable resources from the content and metadata. These reusable resources can each be one of a set of content types. These content types may be content types that are common across a plurality of document authoring platforms and may include, for example, a header, a footer, a document title, a date, an email, or a signature. Thus, in some embodiments the content and metadata of the original document may be processed independently to identify any reusable resources of each specific content type.

In particular embodiments, the identification of the content type of the reusable resource may be based on the content of the text or metadata of the reusable resource, including for example, patterns within the content or the location information of the reusable resource or the content of the original document generally. For instance, analysis of the content to determine such content types may include pattern matching or connected component analysis.

Moreover, each of the content types may be represented using a content type object associated with that content type. A content type object for a content type may identify the content type and include the content and metadata for that content type such the content type object may be utilized in the authoring of a document to include that content of that content type object in the document being authored. Specifically, a content type object may be in a content type format common to a plurality of document authoring tools.

Thus, the reusable resources identified by the parsing of the content and metadata of the original document may be represented with corresponding reusable objects, where each of the reusable objects is an instance of a content type object representing the specific content type of the corresponding reusable resource and including metadata and content of the reusable resource as extracted from the received original document and where each of the reusable objects is in an associated content type format common to a plurality of document authoring tools. In certain instances, this metadata can include the location information for the reusable resource.

These reusable objects can be persisted (e.g., stored) at a document authoring server (or locally on a user's device) and provisioned for use in association with the original document such that the reusable resource objects are adapted for use in authoring other documents using one of the plurality of document authoring tools (e.g., that can consume such content type objects). In this manner, when a definition of another document including an identified one of the set of resources is received this newly defined document can be populated using the associated reusable resource object for the identified resource such that the subsequent document includes the content of the reusable of the resource object.

Thus, embodiments as disclosed herein may have a number of advantages, including the ability to find the content from different document formats and map them to the most relevant content type to return or utilize identified content information appropriately along with their associated attributes. These attributes and content for a reusable resource may be represented in reusable objects associated with an appropriate content type. Thus, a reusable resource is associated with the appropriate information for the corresponding content type (e.g., table information may be returned in terms of rows and columns, while two axis graphs may be returned with its X and Y axis information, etc.). Furthermore, the reusable resources are in a content type format common to a plurality of document authoring tools. This enables these resources to be easily utilized in the authoring of subsequent documents. Moreover, a user may be able to use the content of these reusable resources in a similar manner as supported in a document authoring application. Content identification and mapping to a content type may be consistent regardless of a client application or document composition tool using such reusable resources, or the content included therein. Additionally, document authoring applications can utilize these reusable resources for efficiently migrating content of documents from source to target environments in a manner that allows simple reuse and editing of such content.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 3A is a flow diagram of one embodiment of a method for representing a header content type.

FIG. 4B is a depiction of an example of repeatable header.

FIG. 10B depicts reusable resources associated with the example of FIG. 10A.

DETAILED DESCRIPTION

Figure 1:
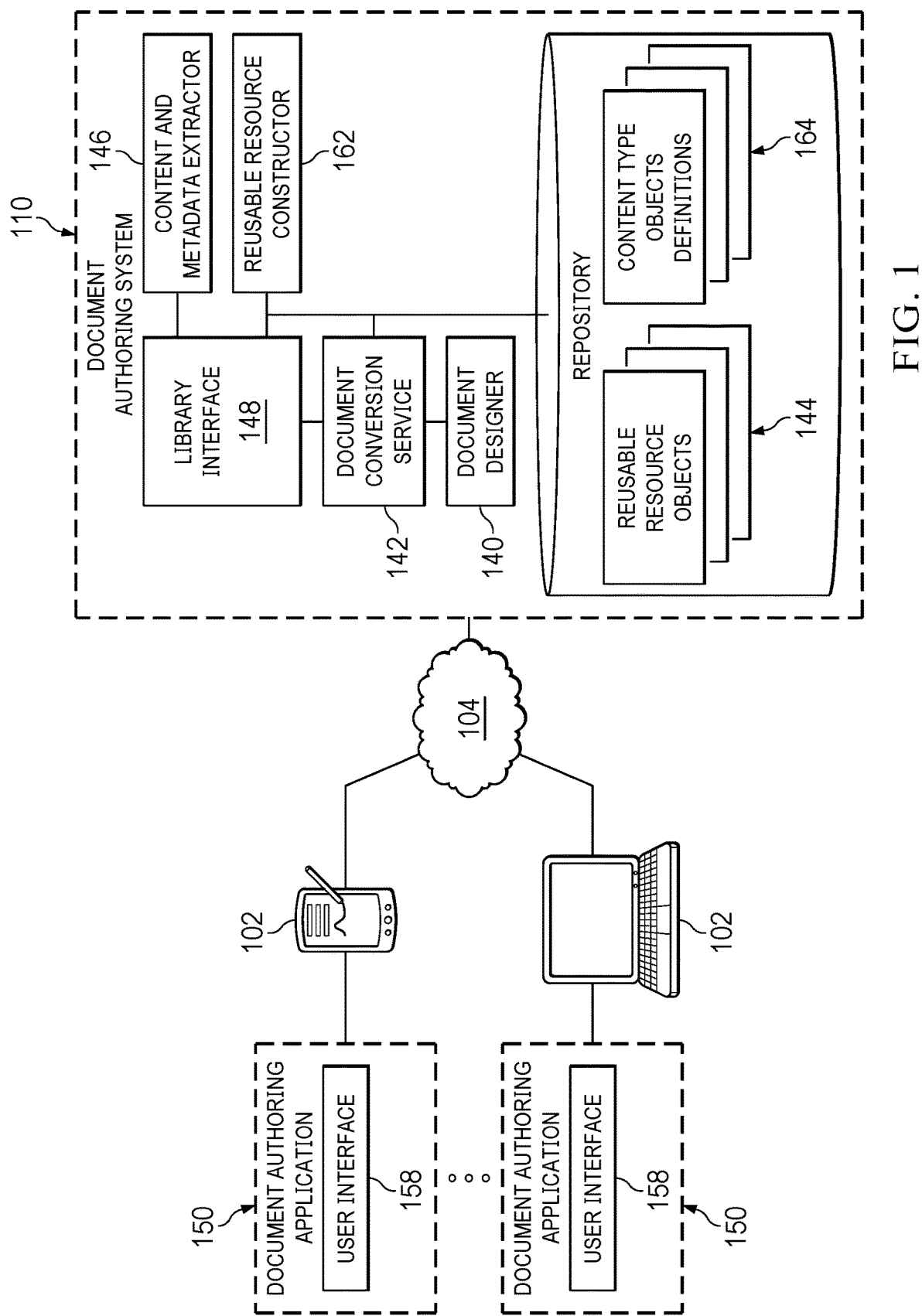
FIG. 1 is a diagrammatic representation of an architecture of a distributed enterprise environment including a document authoring system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in more detail, it may be helpful to discuss some useful context. As discussed, enterprise environments have been steadily growing more complicated, encompassing an ever-expanding amount of increasingly complex content. In an enterprise environment, these assets may be widely distributed and used for a wide variety of purposes in association with that enterprise. To aid in managing and using their various assets, many enterprises have employed a number of content management systems, such as digital asset management (DAM) systems, content management systems (CMS), web content management (WCM) systems, enterprise content management (ECM) systems, etc.

These enterprises, or the users within such enterprises, may thus have a large number of document composition or authoring (used interchangeably) platforms. These document authoring platforms may range from simple word processing applications such as Microsoft Word or the like (which may be used with content management systems or the like), to proprietary document authoring tools (e.g., applications or interfaces that are provided by document authoring platforms, such as proprietary thin client (e.g., browser based) or thick client interfaces.

Often times during the authoring of these documents across these various document authoring platforms or applications users may desire to use portions of content from other documents (e.g., from previously generated documents for other purposes). The reuse of the content of other documents is, however, not straight forward. Documents may not have been generated by the same document authoring platform and thus be in a different format. Accordingly, even if content could be extracted from these documents, it may not be in format that is consumable or other usable by the document authoring platform being utilized by a user. Additionally, there just may be no simple and straightforward way to extract certain types of content from documents generally, or to identify extracted content as a certain type of content.

Specifically, original documents may be in a particular document format such as a format utilized by a document authoring system or another type of format such as a print stream format including, for example, Portable Document Format (PDF) Advanced Function Printing (AFP), line data, metacode, Printer Command Language (PCL), Tag Image File Format (TIFF), etc.

Thus, even in cases where certain content of the document may be extracted, the extracted content is extracted solely as text or image fragments. There is no mechanism to extract contents based on their most relevant and matching content type In other words, the content loses the context of what type of content to which that text or image belongs. Thus, the user is limited in their ability to utilize any extracted content and may not be able to use such extracted content in the manner in which it most relevant (e.g., may not be able to reuse the extracted content as the type of content it was in the original document, such as a document header and footers, email, subject or document title, date/time, signature, table, graph, chart, etc.).

This situation has not curtailed users' desire to extract of multiple types of content of documents into a reusable format consumable across multiple document authoring platforms. What is desired, therefore is that content be extracted as a particular content type in a format associated with that content type that can be easily reused by a number of document authoring platforms, and that may be common to those document authoring platforms.

To that end, embodiments of systems and methods for the conversion of documents to reusable content types are disclosed herein. Embodiments may receive an original document in a particular format, such as a print stream format (e.g., PDF) or the like and extract the content and metadata of the original document. This content and metadata may include, for example, the text or images included in the original document in addition to metadata identifying the location of the text or image. This location information may include X-axis or Y-axis coordinates on a character by character basis or, in some instances may include the identification of paragraphs of text along with such location information.

The content and metadata of the original document can be parsed to identify a set of reusable resources from the content and metadata. These reusable resources can each be one of a set of content types. These content types may be content types that are common across a plurality of document authoring platforms and may include, for example, a header, a footer, a document title, a date, an email, or a signature. Thus, in some embodiments the content and metadata of the original document may be processed independently to identify any reusable resources of each specific content type.

In particular embodiments, the identification of the content type of the reusable resource may be based on the content of the text or metadata of the reusable resource, including for example, patterns within the content or the location information of the reusable resource or the content of the original document generally. For instance, analysis of the content to determine such content types may include pattern matching or connected component analysis.

Moreover, each of the content types may be represented using a content type object associated with that content type. A content type object for a content type may identify the content type and include the content and metadata for that content type such the content type object may be utilized in the authoring of a document to include that content of that content type object in the document being authored. Specifically, a content type object may be in a content type format common to a plurality of document authoring tools.

Thus, the reusable resources identified by the parsing of the content and metadata of the original document may be represented with corresponding reusable objects, where each of the reusable objects is an instance of a content type object representing the specific content type of the corresponding reusable resource and including metadata and content of the reusable resource as extracted from the received original document and where each of the reusable objects is in an associated content type format common to a plurality of document authoring tools. In certain instances, this metadata can include the location information for the reusable resource.

These reusable objects can be persisted (e.g., stored) at a document authoring server (or locally on a user's device) and provisioned for use in association with the original document such that the reusable resource objects are adapted for use in authoring other documents using one of the plurality of document authoring tools (e.g., that can consume such content type objects). In this manner, when a definition of another document including an identified one of the set of resources is received this newly defined document can be populated using the associated reusable resource object for the identified resource such that the subsequent document includes the content of the reusable of the resource object.

Referring then to FIG. 1, an example of an architecture of a distributed computing environment with an embodiment of a document authoring system is depicted. Computing environment may include a document authoring system 110 (e.g., a CMS, a DAM, a WCM, an ECM or a CCM), coupled to user devices 102 over network 104. Network 104 may be the Internet, an intranet, a wireless or wired network, a LAN, a WAN, some combination of these types of networks or another type or types of network.

The document authoring system 110 may operate generally to allow users at user devices 102 to author (e.g., access, create or modify) documents using a provided user interface 158 of a document authoring application 150. These documents may, for example, be stored locally in a data store associated with the document authoring system 110 or stored at a remote location.

These enterprises, or the users within such enterprises, may thus have a large number of document composition or authoring (used interchangeably) platforms or applications (generally referred to as a document authoring application 150). These document authoring platforms may range from simple word processing applications such as Microsoft Word or the like (which may be used with content management systems or the like), to proprietary document authoring tools (e.g., applications or interfaces that are provided by document authoring platforms, such as proprietary thin client (e.g., browser based) or thick client interfaces. Thus, in one embodiment, a document designer 140 at the document authoring system 110 can interact with, or provide, the document authoring application 150 to provide user interface 158 allowing a user to author a document.

In conjunction with the creation or modification of documents using the document authoring application 150, the document authoring system 110 may allow the user to access or incorporate content from other documents. These other documents may be documents authored using the document authoring platform 110 or documents obtained from other sources entirely.

Document conversion service 142 may, for example, be a microservice that may be accessible through a RESTful interface, or an application programming interface such that a document authoring application 150 may send a request to the document conversion 142 requesting that the reusable resources in the document be identified and returned. The document conversion service 142 can identify a set of reusable resources from the document. These reusable resources can each be one of a set of content types that may be common across a plurality of document authoring applications 150 and may include, for example, a header, a footer, a document title, a date, an email, or a signature.

The document conversion service 142 constructs a reusable object (also referred to as a reusable resource object) 144 for each identified reusable resource. Each reusable resource may be an instance of a content type object associated with the content type of that reusable resource. These reusable objects 144 can be persisted (e.g., stored) at a document authoring system 110 and returned (or identified) to the requesting document authoring application 150 for use in authoring other documents using the document authoring application 150 that originated the request. Additionally, the user at the device 102 may utilize another document authoring application 150 to author document using the reusable objects 144 or another user at another document authoring application 150 (e.g., of another type) may also use the reusable objects 144 to author a document.

To illustrate in more detail, according to particular embodiments a user at a document authoring application 150 may indicate that they wish to identify or reuse content of a particular document. The document authoring application may then send a request for identification of reusable resources to the document conversion service 142. Embodiments of the document conversion service 142 may thus receive an original document in a particular format, such as a print stream format (e.g., PDF) or the like. In some cases, the document may be converted from a source format to the print stream format before the request to the document conversion service 142 is sent from the document authoring application 150 or after the document is received at the document conversion service.

The document conversion service 142 may access a content and metadata extractor 146 to extract the content and metadata of the received original document (e.g., in the print stream format). The content and metadata extractor 146 may be a library that may be accessed, for example, through a library interface 148. The content and metadata extractor may, for example, Apache pdf, Apache pdfbox or Apache POI. Thus, the document conversion service 142 may provide the original document to an appropriate content and metadata extractor 146 for content and metadata extraction based on a format of the original document received.

The content and metadata extractor 146 may thus extract the content and metadata from the original document and return this content and metadata for the original document to the document conversion service 142. This content and metadata may include, for example, the text or images included in the original document in addition to metadata identifying the location of the text or image. This location information may include X-axis or Y-axis coordinates on a character by character basis for the content or, in some instances may include the identification of paragraphs of text along with such location information. The identification of these paragraphs in the metadata may also include the identification of child paragraphs or parent paragraphs in certain cases.

The content and metadata of the original document can then be evaluated to identify a set of reusable resources from the content and metadata. Here, document conversion service 142 may pass the content and metadata to reusable resource constructor 162, using for example the library interface 148. Reusable resource constructor 162 may parse the content and metadata to identify a set of reusable resources from the content and metadata. These reusable resources can each be one of a set of content types. These content types may be content types that are common across a plurality of document authoring platforms and may include, for example, a header, a footer, a document title, a date, an email, or a signature. In some embodiments, reusable resource constructor 162 may process the content and metadata of the original document independently (e.g., using a different evaluation for each content type) to identify any reusable resources of each specific content type.

In particular embodiments, the identification of the content type of the reusable resource may be based on the content of the text or metadata of the reusable resource, including for example, patterns within the content or the location information of the reusable resource or the content of the original document generally. For instance, analysis of the content to determine such content types may include pattern matching or connected component analysis.

Moreover, each of the content types may be represented using a content type object associated with that content type. A content type object for a content type may identify the content type and include the content and metadata for that content type such the content type object may be utilized in the authoring of a document to include that content of that content type object in the document being authored.

Specifically, in embodiments a content type object may be in a content type format common to (e.g., a standardized format or a format adapted to be utilized by a plurality of document authoring tools). The definitions 164 for these content type objects may be defined at the document authoring system 110. Thus, a reusable object 144 for a particular content type may be instantiated from a content type object definition 164 for that content type and populated with the content and metadata of the identified reusable resource according to the definition 164 of that content type object. For example, the reusable object 144 is populated with the appropriate content and metadata for that content type, where the content and metadata used to populate the reusable object for the identified reusable resource is obtained from the content and metadata associated with the identified reusable resource as obtained from the original document. Examples of the definitions for such content type objects that may be utilized in certain embodiments are included herein in Appendix A.

Thus, the reusable resources identified by the parsing of the content and metadata of the original document may be represented with corresponding reusable objects, where each of the reusable objects is an instance of a content type object defined in the definitions 164 for these content type objects. Each reusable object 144 (e.g., instance of a content type object) may represent the specific content type of the corresponding reusable resource and include metadata and content of the identified reusable resource as extracted from the received original document. In certain instances, this metadata can include the location information for the reusable resource. These reusable objects 144 are thus in an associated content type format common to a plurality of document authoring tools.

These reusable objects 144 can be persisted (e.g., stored) at a document authoring system 110 (or locally on a user's device 192) and provisioned for use (e.g., in association with the original document) such that the reusable resource objects 144 are adapted for use in authoring other documents using one of the plurality of document authoring applications 150 (e.g., that can consume such content type objects).

Moreover, the document conversion service 142 may return the identified content types (e.g., along with their corresponding reusable objects 144) to the requesting document authoring application 150 at the user device. In this manner, when a definition of another document including an identified one of the set of resources is received (e.g., at document authoring system 110 from the document authoring application 150) this newly defined document can be populated using the associated reusable resource object for the identified resource such that the subsequent document includes the content of the reusable of the resource object 144.

As an example of how a user may utilize such a document authoring system 150, a user at a document authoring application 150 may wish to create a document (e.g., an insurance template or communication) using existing content from a set of documents (e.g., pdf documents). A user can use the document authoring application 150 (by for example, clicking on an "Import Contents" button on the interface 158) to import the content from the input documents. The user may be presented an interface where there is a provision to upload or indicate a document (e.g., including the PDF document files) using "Upload" button. The user can review the content extracted from the input documents shown in a view in the interface 158. The user can also use the interface 158 to select a specific reusable resource for a content type, or a set of reusable resource for multiple content types, to be added to a document being authored using a button (e.g., a "Select" button) presented in the interface 158. Once the content for the selected reusable resources is added into the document, the user may change or extend the content as desired. In this manner, the user may be able to work with content as per its type and applicable operations.

Figure 2:
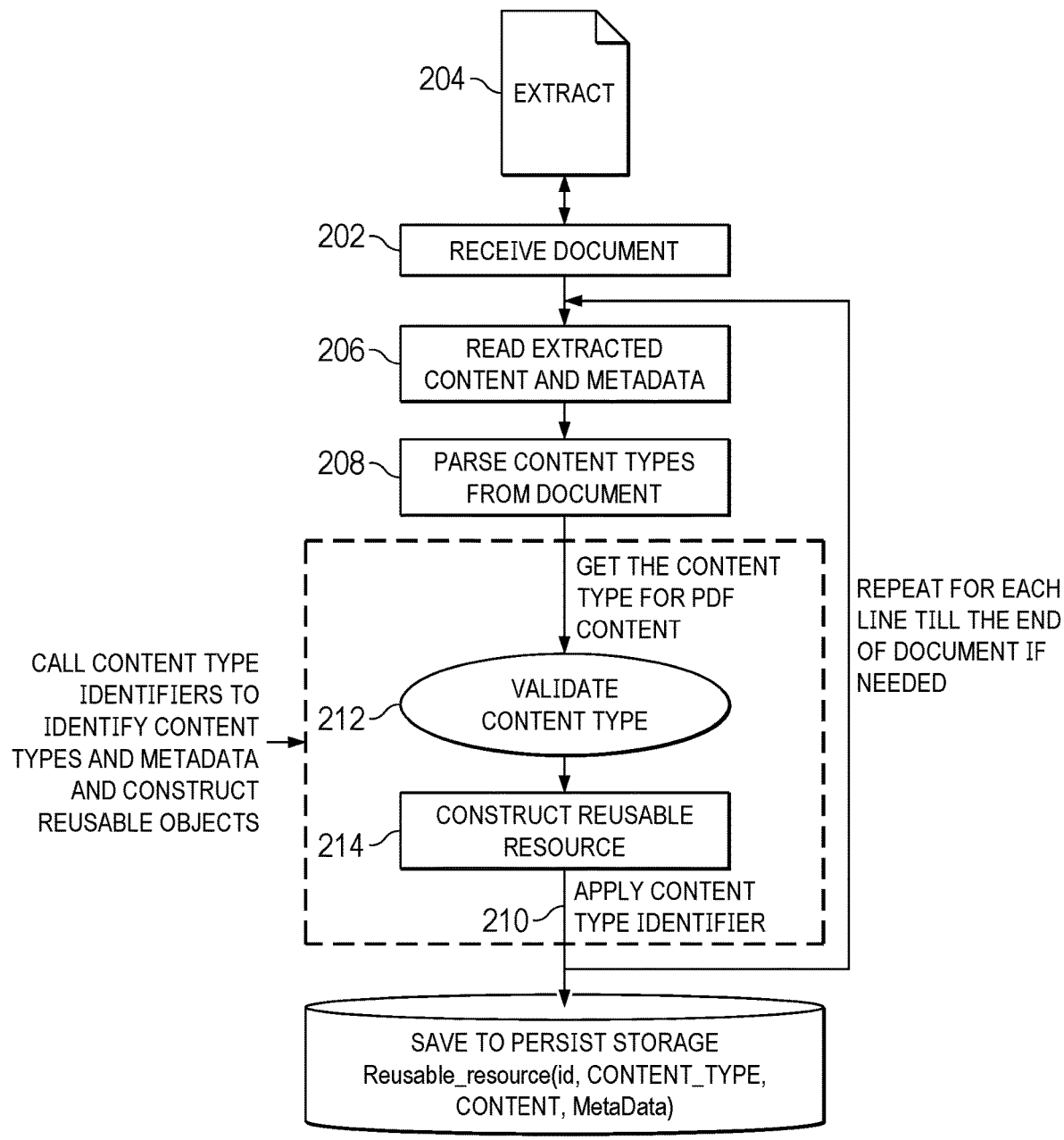
FIG. 2 is a flow diagram of one embodiment of a method for representing reusable objects.

Moving then to FIG. 2, one embodiment of a method for constructing reusable object from identified reusable resources of particular content types that may be employed by embodiment of a document authoring system is illustrated. Initially, a user at a document authoring application may indicate that they wish to identify or reuse content of a particular document. An original document may thus be received in a particular format, such as a print stream format (e.g., PDF) or the like (STEP 202).

The document conversion service may access a content and metadata extractor to extract the content and metadata of the received original document (e.g., in the print stream format) (STEP 204). The content and metadata extractor may be a library such as Apache pdf, Apache pdfbox or Apache POI. The content and metadata extractor may thus extract the content and metadata from the original document and return this content and metadata for the original document.

This content and metadata may include, for example, the text or images included in the original document in addition to metadata identifying the location of the text or image. This location information may include X-axis or Y-axis coordinates on a character by character basis for the content or, in some instances may include the identification of paragraphs of text along with such location information. The identification of these paragraphs in the metadata may also include the identification of child paragraphs or parent paragraphs in certain cases.

The content and metadata of the original document can then be evaluated to identify a set of reusable resources from the content and metadata. Specifically, embodiments may read the extracted content and metadata on a line by line basis (STEP 206) and parse the lines of extracted content and metadata of the original document to identify each of set of content types that are present in the original document (STEP 208). In particular, a content type identifier (e.g., an identifier process) for each of a set of content types may be independently applied to the lines of the extracted content and metadata of the original document (STEP 210) to validate (e.g., determine) any instances of reusable resources of that content type in the original document (STEP 212) and construct a reusable object for that content type (STEP 214) (including extracting content and the metadata for that reusable resource to populate a reusable object of the appropriate content type object). The reusable objects may have an identifier (e.g., for subsequent reuse), an identifier for the content type (e.g., a CONTENT_TYPE) and include the pertinent content and metadata for that content type object for the content type.

These reusable objects can be persisted (e.g., stored) at a document authoring system or locally on a user's device) and provisioned for use (e.g., in association with the original document) such that the reusable resource objects are adapted for use in authoring other documents using one of the plurality of document authoring applications (e.g., that can consume such content type objects) (STEP 216). Moreover, the identified content types (e.g., along with their corresponding reusable objects) may be provided to a document authoring application at the user device for use in authoring documents.

Figure 3B:
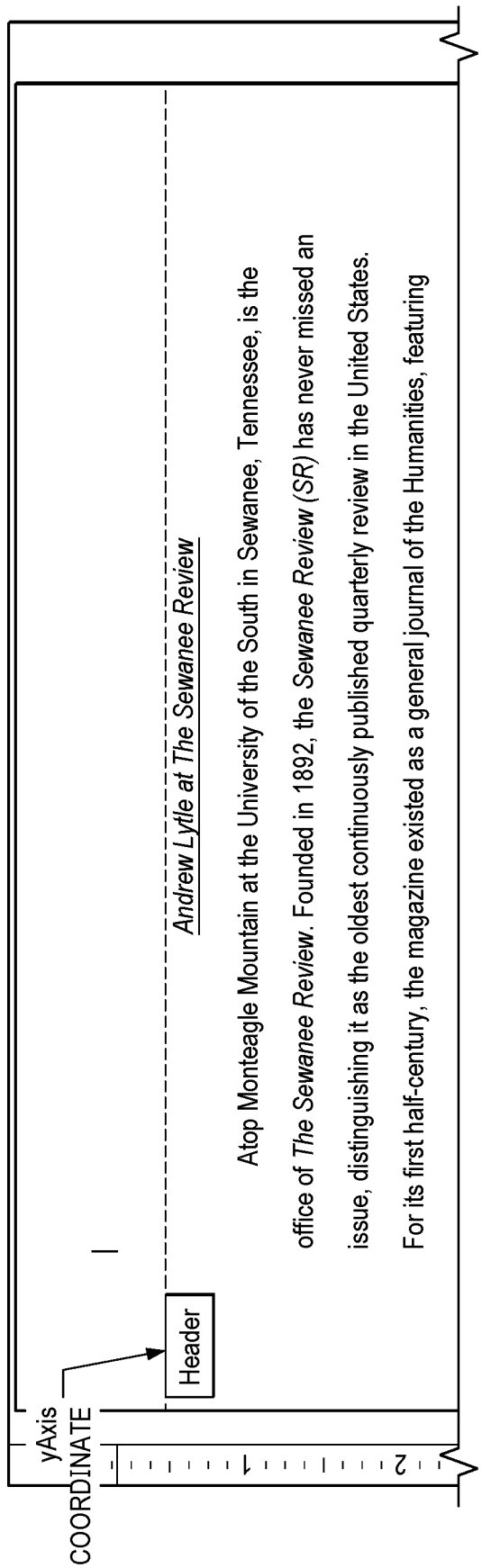
FIG. 3B is a depiction of an example of a header.

Looking then at FIG. 3A, one embodiment of a method for a content type identifier for a header content type is depicted. FIG. 3B depicts a graphical example of such a content type. It will be understood that the same or a similar method may be applied to implement a content type identifier for a footer content type. Here, the YAXIS_HEADER value may be a positional value (e.g., absolute value or range) that may designate a y axis (e.g., coordinate) value above which a header (or below which a footer) may be identified. Such a YAXIS_HEADER value is graphically illustrated in FIG. 3B. A MAX_PAGE_NO value may be an initial number of pages of the original document to which the method may be applied to determine if a header (or footer) exists (e.g., if a header does not appear before the MAX_PAGE_NO value the header content identifier may cease processing the document).

Accordingly for each page in the original document (STEP 302), each section of content of the page identified as a paragraph may be extracted from the content and metadata for the document (STEP 304). Thus, each page of the document may be evaluated for header, starting with the first page. In particular for a page (e.g., the content and metadata for a page of the original document), starting with the initial paragraph it can be determined if that paragraph is above (e.g., has a Y axis coordinate less than) the YAXIS_HEADER value (STEP 306). If so (Y branch of STEP 306), and if the paragraph is from the same page (e.g., as determined by the page number associated with the paragraph) (STEP 308) it may be added to the content of a reusable resource for a header content type and the metadata of the resource object for the header (e.g., the coordinates, etc.) may be updated based on the paragraph just added (STEP 310). The next paragraph of the page can then be extracted and evaluated to see if it is above (e.g., has a Y axis coordinate less than) the YAXIS_HEADER value (STEPS 304, 306).

If the paragraph is from a different page or is not above the YAXIS_HEADER value, the created header resource object may be stored (STEP 308). Once a paragraph of a page is encountered that is below (e.g., has a Y axis coordinate more than) the YAXIS_HEADER value (No branch of STEP 306) it can be determined if the number of the next page of content of the original document is less than the MAX_PAGE_NO value (STEP 312). If the number of the page is less than (or equal to) the MAX_PAGE_NO value (Y branch of STEP 312) the next page may be evaluated, while if the number of the page is greater than the MAX_PAGE_NO value (N branch of STEP 312), the header reusable resource objects may be returned or persisted (STEP 314). In this manner, it can be determined for each page if that page has a header where the header may be a composite of each paragraph of the page that is identified as above the YAXIS_HEADER value. It will be noted that other validations may be performed in association with the determination of a header reusable object, including for example, comparing if similar content appears at the same position in multiple pages and is appearing consistently at the same location or has the same content. This may be referred to as repeating header.

Figure 4A:
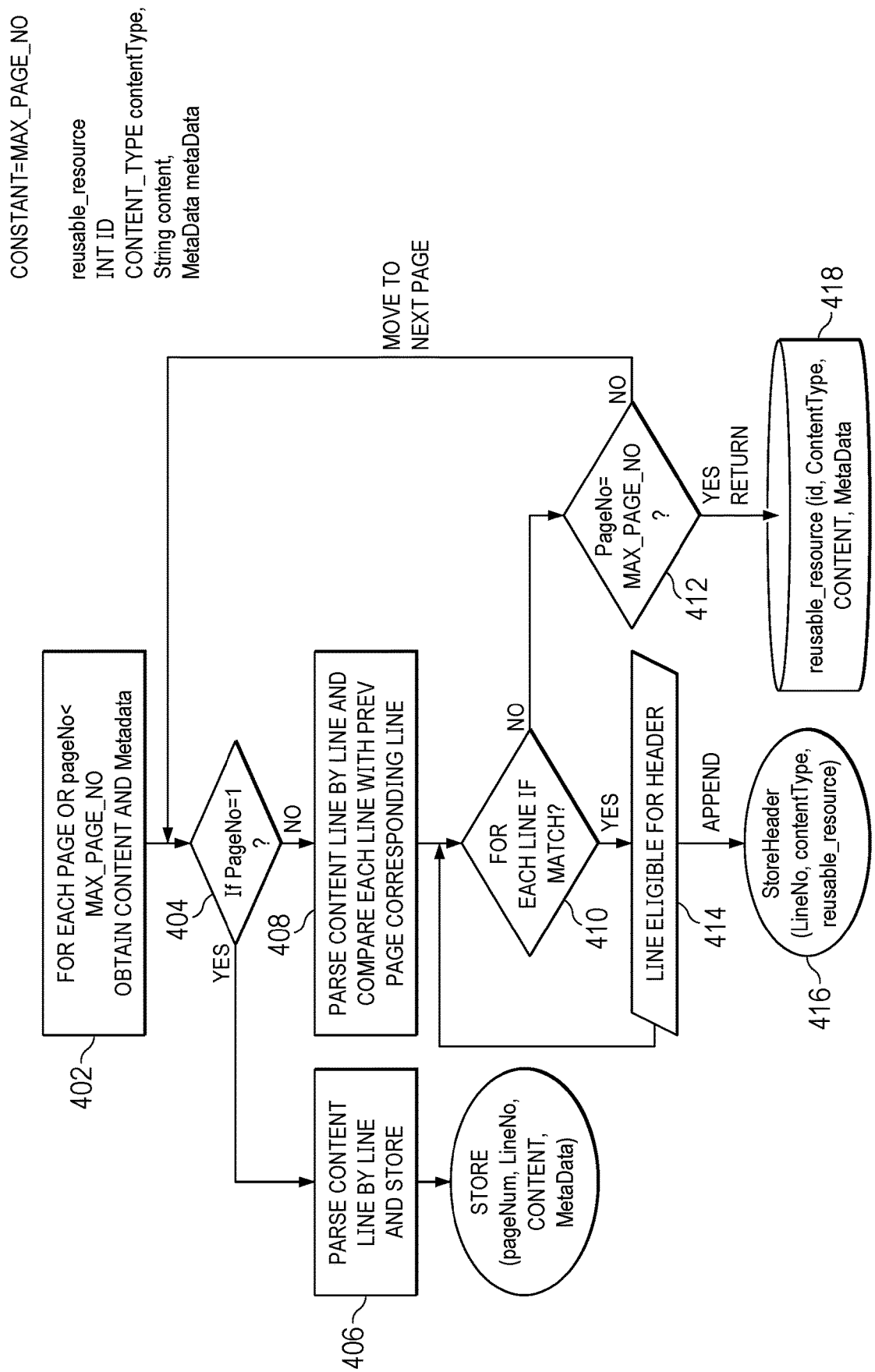
FIG. 4A is a flow diagram of one embodiment of a method for representing a repeatable header.
Figure 4B:
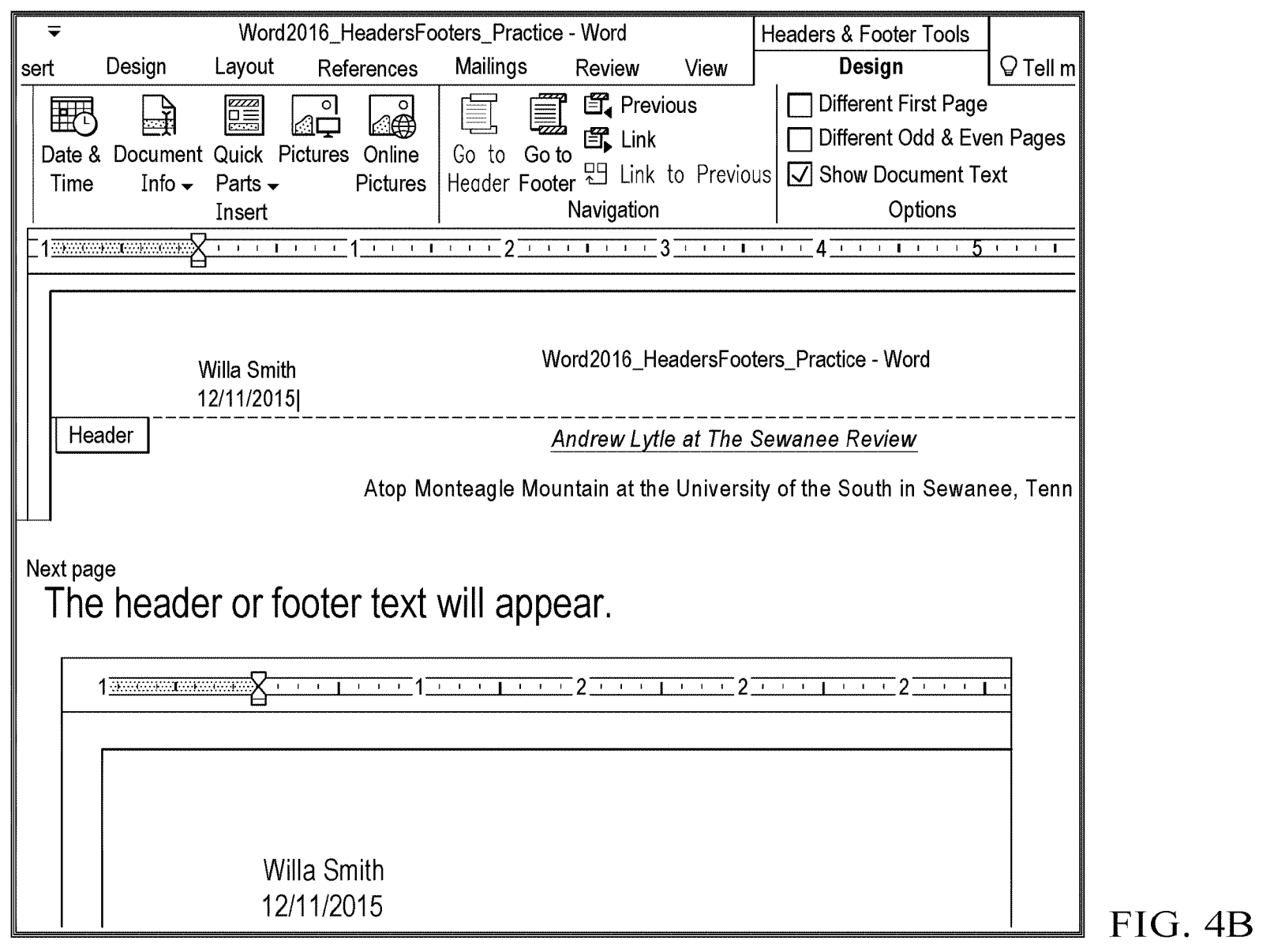

FIG. 4A depicts one embodiment of a method for a content type identifier for a repeatable header content type. Embodiments of such a content type identifier may thus attempt to identify one or more initial lines of every page that are similar to the initial lines of a first page of the original document. FIG. 4B depicts a graphical example of such a content type as it may occur in an original document. Again, a MAX_PAGE_NO value may be an initial number of pages of the original document to which the method may be applied to determine if a repeatable header exists (e.g., if a repeatable header does not appear before the MAX_PAGE_NO value the repeatable header content identifier may cease processing the document).

Initially then the MAX_PAGE_NO of pages or all the pages of the original document may be evaluated by the repeatable header content type identifier (STEP 402). To evaluate these pages, the content and metadata for these pages may be obtained (STEP 402). The content and metadata can be evaluated (or paragraph by paragraph, etc.) basis to determine the content and metadata associated with the first page of the original document (e.g., page number one of the original document) (STEP 404). The content and metadata associated with the first page of the original document (Y branch of STEP 404) can be parsed on a line by line (or paragraph by paragraph, etc.) basis and stored such that there is each line of the first page is stored and associated with its corresponding page number, line number on the page, and the content and metadata associated with that line (STEP 406).

Once all the lines of the first page are stored (N branch of STEP 404) one or more of the subsequent pages can then be processed. Specifically, starting with the second page, each page may be processed in order, where processing a page may include determining the content of that page on a line by line (e.g., or paragraph by paragraph, etc.) basis and each line of that page may be compared with the corresponding line of the first page (STEP 408). In other words, the content of the first line of the page being processed may be compared with the first line of the first page followed (if needed) by the second line of the page being processed being compared with the second line of the first page, etc.

Specifically, beginning with the first line and taking the lines of the page being processed in order, for each line of the page being processed that matches a corresponding line in the first page (Y branch of STEP 410) that line may be considered as part of a repeatable header (STEP 414) and added to the content of a reusable resource for a repeatable header content type (STEP 416). As can be seen, the lines may be compared in order such that as soon as lines are not matched any subsequent lines may not be considered eligible for a reputable header and there may be no need to compare such lines. Additionally, the metadata of the resource object for the repeatable header (e.g., the coordinates, etc.) may be updated based on the line just added.

At the point where it is determined that a line of the page being processed does not match a corresponding line of the first page (N branch of STEP 410) it can be determined if the number of the next page of content of the original document is equal to (or greater than) the MAX_PAGE_NO value (STEP 412). If the number of the page is less than the MAX_PAGE_NO value (N branch of STEP 412) the next page may be evaluated, while if the number of the page is equal to (or greater than) the MAX_PAGE_NO value (Y branch of STEP 412), the repeatable header reusable resource objects may be returned or persisted (STEP 418). In some embodiments, if it is determined that a repeatable header reusable resource is not present on the second page of the original document the repeatable header content type may cease processing the content and metadata of the original document (e.g., the MAX_PAGE_NO value may be two).

Figure 5A:
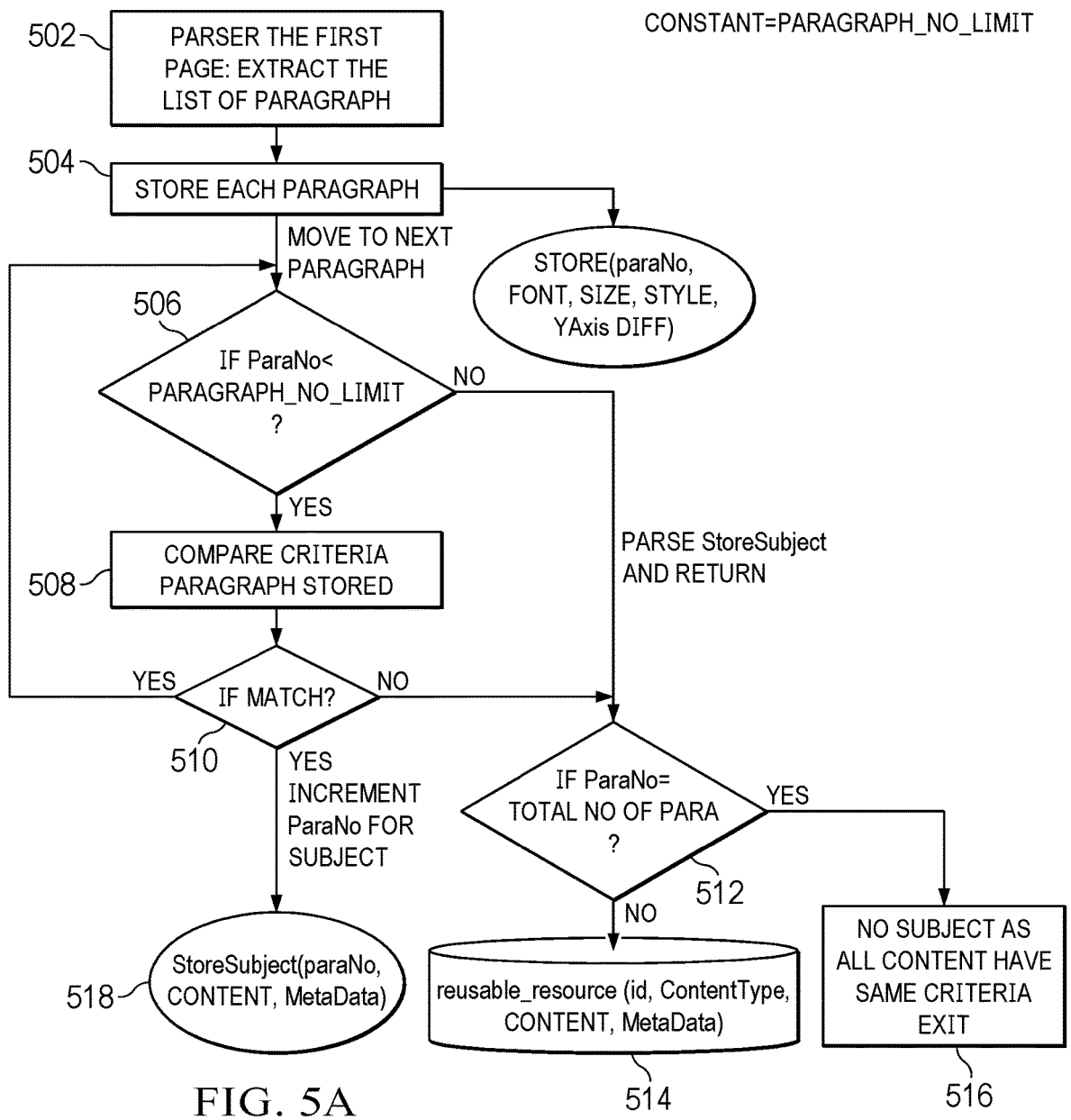
FIG. 5A is a flow diagram of one embodiment of a method for representing a subject or title.
Figure 5B:
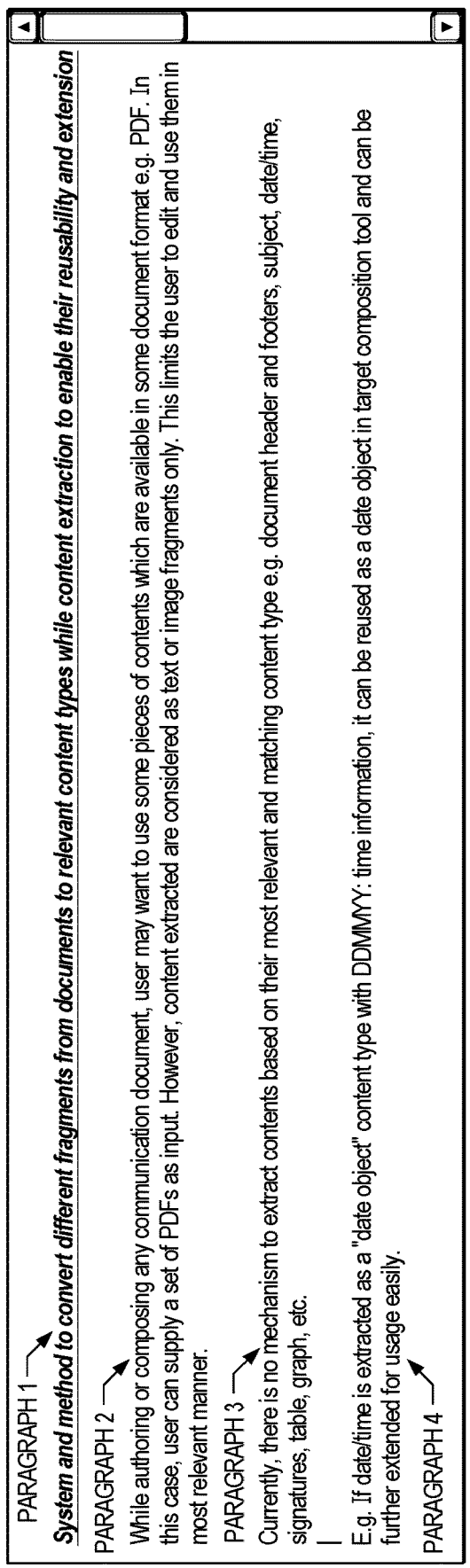
FIG. 5B is a depiction of an example of an example of a subject or title.

Turning now to FIG. 5A, one embodiment of a method for a content type identifier for a document title or subject (e.g., an abstract or summary) content type is depicted. This content type may be for a header or title appearing at a top of a document. Embodiments of such a content type identifier may thus attempt to identify one or more initial paragraphs of a page that are different than subsequent paragraphs of the page. FIG. 5B depicts a graphical example of such a content type as it may occur where paragraph one may be considered a document title or subject content type.

Here, a PARAGRAPH_NO_LIMIT may be a value indicating an initial number of paragraphs of each page (e.g., as illustrated a first page, but which may apply to any page of the original document in other embodiments) to which the method may be applied to determine if a document title or subject exists (e.g., if a document title or subject does not appear before the PARAGRAPH_NO_LIMIT of the page the document title or subject content identifier may cease processing the page or document).

Thus, initially the content and metadata associated with the first page of the original document can be parsed on a paragraph by paragraph (e.g., or line by line) basis and stored (STEPS 502, 504) such that each paragraph of the first page is stored and associated with its content and metadata associated with that paragraph, including the criteria associated with that paragraph such as the font, style, size, and location information. This metadata (e.g., criteria) for each paragraph may thus include location information for the paragraph such as the coordinates on the page of the original document associated with the paragraph or maximum or minimum X or Y coordinates or a X axis or Y axis difference (e.g., a difference between the maximum or minimum X or Y coordinates respectively). These X axis or Y axis differences may give an indication of the size of the paragraph.

The paragraphs of the first page can then be evaluated in order beginning with the first paragraph of the page. Specifically, if the number of the paragraph being evaluated is less than the PARAGRAPH_NO_LIMIT (Y branch of STEP 506) the criteria of that paragraph may be compared with the previous paragraph (e.g., if it is not the first paragraph) (STEP 508). Specifically, the criteria associated with the paragraph such as the location information (e.g., X axis or Y axis difference) of the paragraph may be compared with the criteria associated with the previous paragraph (e.g., to determine if the comparison of the criteria indicates the paragraphs match).

If the paragraph matches the previous paragraph (e.g., or is the first paragraph of the page) (Y branch of STEP 510) that paragraph may be considered as part of a potential document title or subject content type reusable resource and added to the content of a reusable resource object for a document title or subject content type (STEP 518). Additionally, the metadata of the resource object for the document title or subject content type (e.g., the coordinates, etc.) may be updated based on the paragraph just added. The next paragraph of the page can then be evaluated (STEP 506).

If there is not a match between the paragraph and the previous paragraph (N branch of STEP 510) or the maximum number of paragraphs to evaluate has been exceeded (N branch of STEP 506) it can be determined if the current paragraph being evaluated is the last paragraph of the page (e.g., if the number of the paragraph being evaluated is the same as the total number of paragraphs on the page) (STEP 512). If the current paragraph being evaluated is the last paragraph of the page (Y branch of STEP 512) it can be determined that there is no initial subject or title and the content identifier for the subject or title may exit (STEP 516). Here, then, each paragraph has been evaluated without finding a difference between the criteria of the first paragraph and any subsequent paragraph. Such a situation may indicate that all paragraphs are substantially the same based on the criteria and none may be identified as a subject or title.

Conversely, if the current paragraph being evaluated is not the last paragraph of the page (N branch of STEP 512) the assembled subject or title reusable resource objects may be returned or persisted (STEP 514). Here, then, it has been determined that an initial number of paragraphs are different (e.g., their criteria does not match), and thus the initial number of paragraph may comprise a title or subject reusable resource and represented in a resource object for that document and title.

Figure 6:
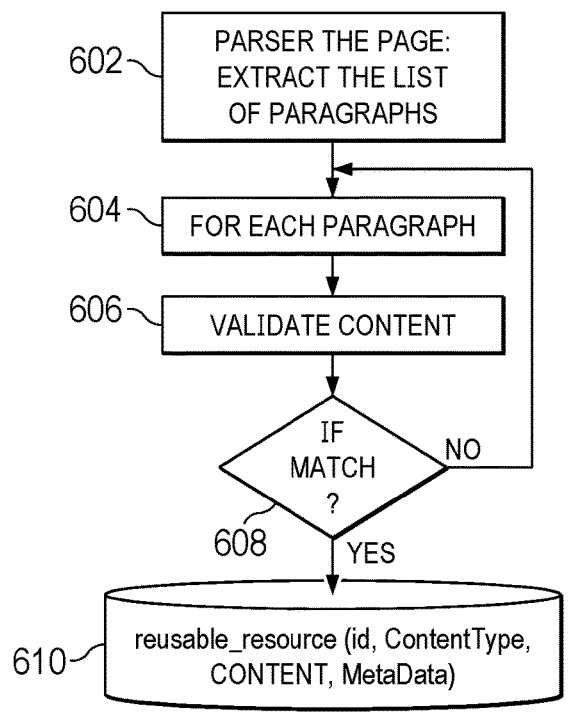
FIG. 6 is a flow diagram of one embodiment of a method for representing an email.
Figure 7:
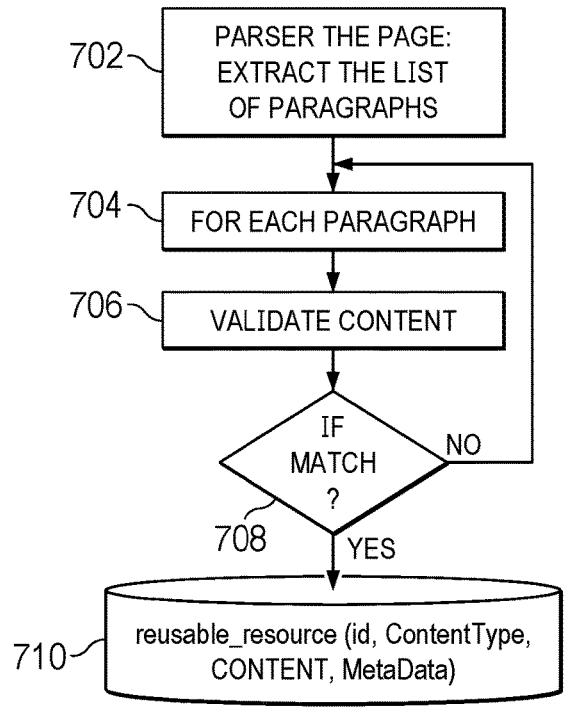
FIG. 7 is a flow diagram of one embodiment of a method for representing a date or time.
Figure 8:
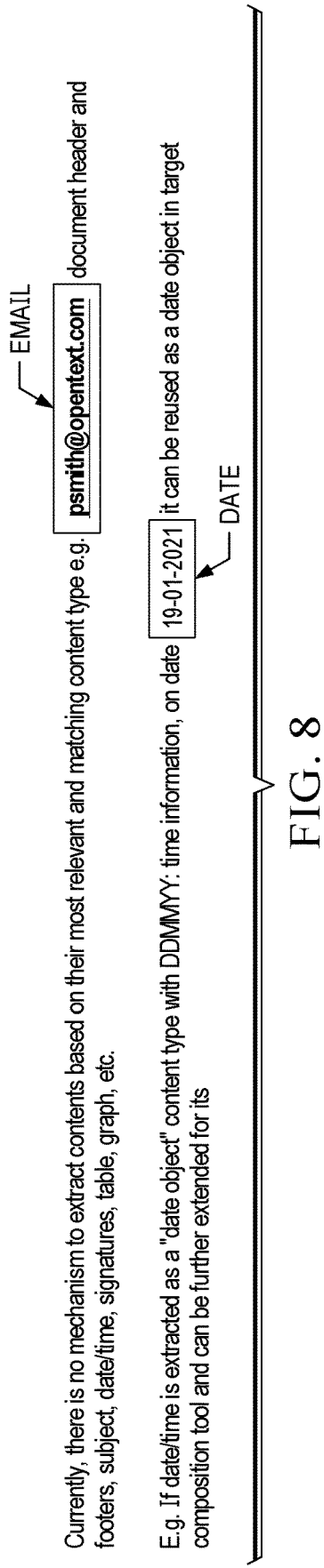
FIG. 8 is a depiction of an example of an example of an email and date or time.

Certain reusable resources may be determined using pattern matching or the like. For example, FIG. 6 depicts one embodiment of a method for a content type identifier for an email address content type while FIG. 7 depicts one embodiment of a method for a content type identifier for a date/time content type. FIG. 8 depicts a graphical example of an email content type and a date/time content type that may appear in a document.

First with reference to FIG. 6, one embodiment of a method for a content type identifier for an email address content type is depicted. Here, the content and metadata associated with each paragraph of a page (e.g., where all pages or a subset of pages of the original document may be evaluated) may be obtained and evaluated (STEPS 602, 604). For each paragraph, it can be evaluated to determine if any content of the paragraph includes a particular pattern or sequence of characters identifying an email (STEP 606). These email identifying characters or patterns may include character identifiers (e.g., "@") or a sequences of characters (e.g., ".com", ".org", ".gov", etc.).

If there is match to one of the email identifying characters or patterns (Y branch of STEP 608), the email address may be extracted and added to the content of a reusable resource object for an email content type (STEP 610). Additionally, the metadata of the resource object for the document title or subject content type (e.g., the coordinates, etc.) may be updated based on the paragraph or email address determined. The assembled email reusable resource objects may be returned or persisted (STEP 610). The next paragraph of the page can then be evaluated (STEP 604).

Similar logic is applied for a content type identifier for a date or time appearing in a document. FIG. 7 depicts one embodiment of a method for a content type identifier for a date/time content type. The content and metadata associated with each paragraph of a page (e.g., where all pages or a subset of pages of the original document may be evaluated) may be obtained and evaluated. (STEPS 702, 704). For each paragraph, it can be evaluated to determine if any content of the paragraph includes a particular pattern or sequence of characters identifying an date/time (STEP 706). These date/time identifying characters or patterns may include character identifiers or a sequences of characters (e.g., "dd-mm-yyyy", "yyyy-mm-dd", "dd-mm-yy", "yy-mm-dd", etc.).

If there is match to one of the date/time identifying characters or patterns (Y branch of STEP 708), the date/time may be extracted and added to the content of a reusable resource object for a date/time content type (STEP 710). Additionally, the metadata of the resource object for the date/time content type (e.g., the coordinates, etc.) may be updated based on the paragraph, or date/time determined. The assembled date/time reusable resource object may be returned or persisted (STEP 710). The next paragraph of the page can then be evaluated (STEP 704).

Figure 9B:
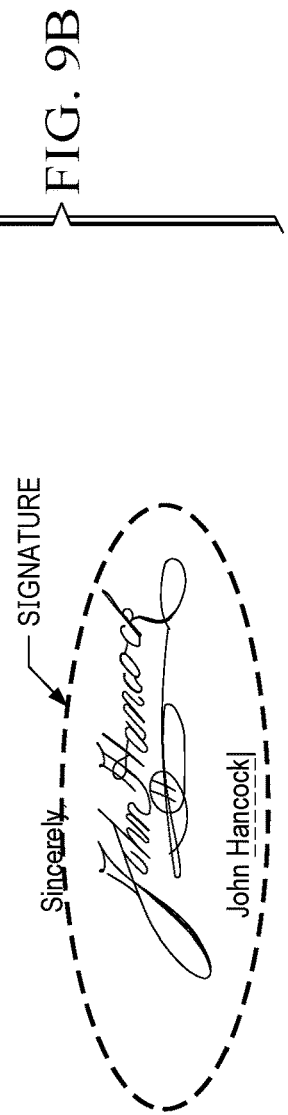
FIG. 9B is a depiction of an example of an example of a signature.
Figure 9A:
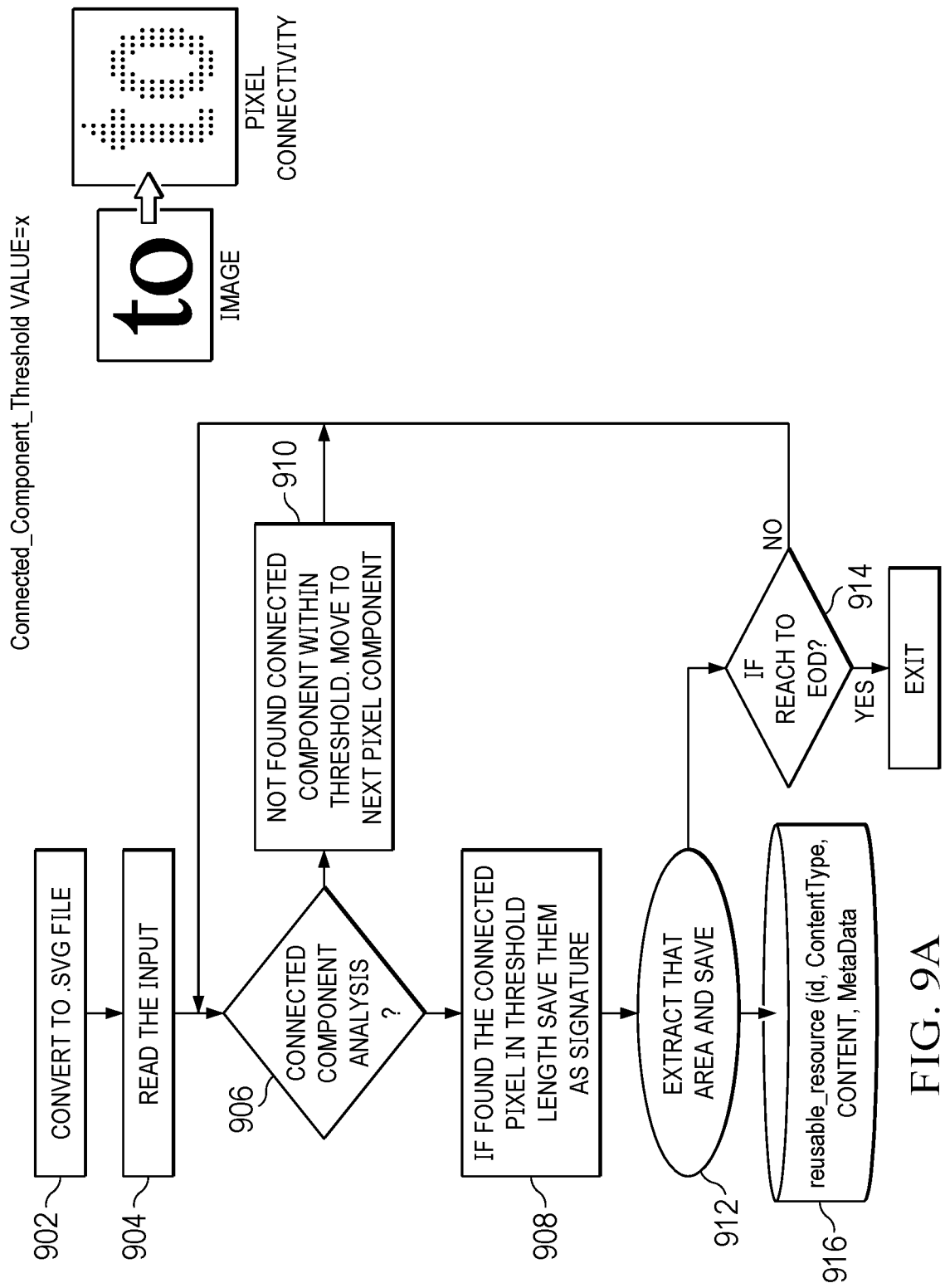
FIG. 9A is a flow diagram of one embodiment of a method for representing a signature.

Certain reusable resources may be determined using connected component analysis or the like. FIG. 9A depicts one embodiment of a method for a content type identifier for a signature content type. FIG. 9B depicts a graphical example of such a content type. Here, the original document may be converted to a image file format (e.g., an .svg of .png file) (STEP 902) and the resulting image read (STEP 904). This image will comprise a set of pixels. And specifically the image file may include pixel values for each of the characters of the original document.

The image file can then be evaluated using a connected component analysis (STEP 906) to determine if there are a set of pixels of the image file that should be identified that are connected above some connected component threshold value (x). In other words, starting with a pixel (e.g., a pixel value) a connected component evaluation may be performed to determine if there are a threshold number of pixels (e.g., starting with that pixel) of the image file that are deemed as connected to that pixel.

If there are a threshold number of connected pixels (STEP 908), that area of the image file may be extracted and added to the content of a reusable resource object for a signature content type (STEP 912). Additionally, the metadata of the resource object for the signature content type (e.g., the coordinates, etc.) may be updated based on the signature determined. The assembled signature reusable resource object may be returned or persisted (STEP 916). The next pixel of the image file can then be evaluated (STEP 906) if the end of the image file has not been reached (N branch of STEP 914).

If there are not a number of connected pixels (STEP 910), a connected component analysis beginning with the next pixel may occur (STEP 906) (e.g., if the end of the document has not been reached) (N branch of STEP 914).

Figure 10A:
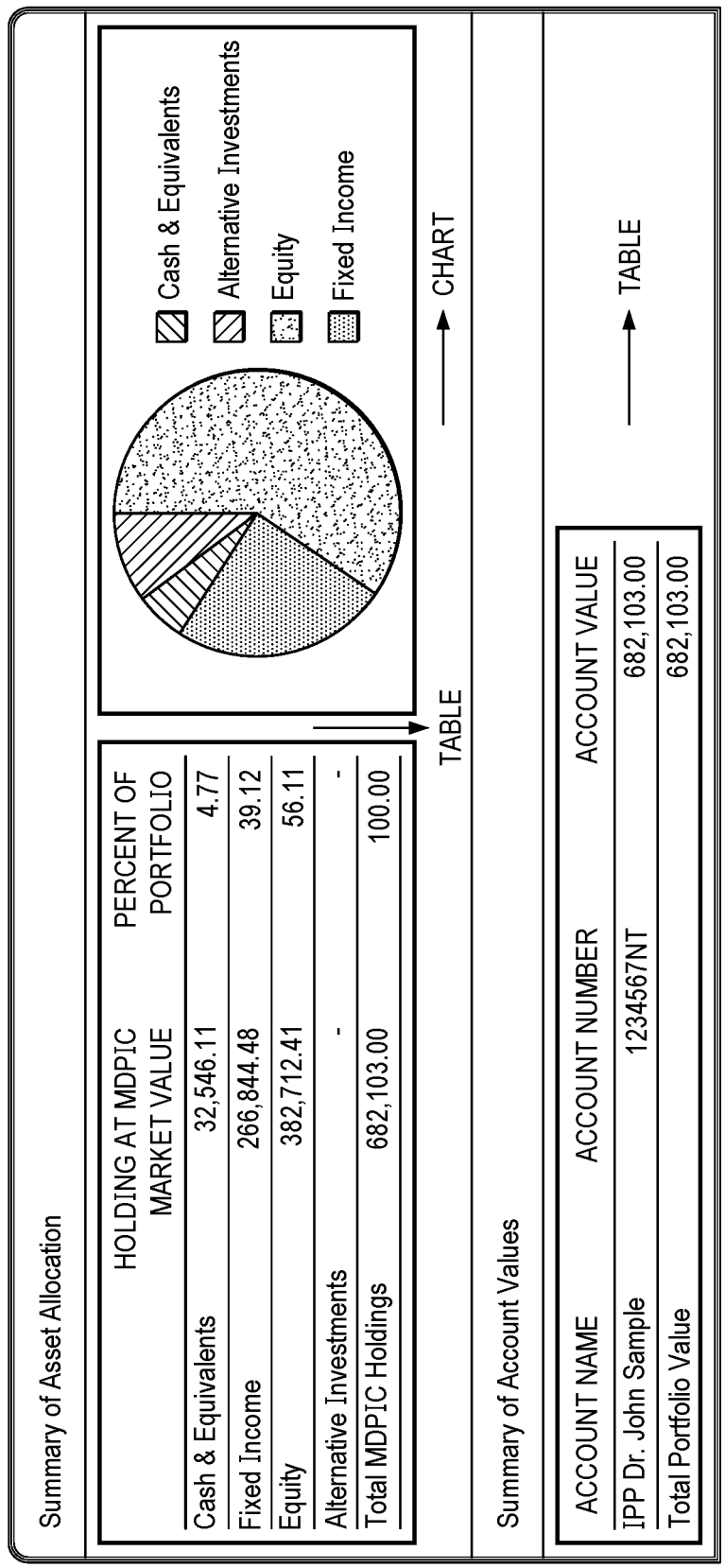
FIG. 10A depicts one embodiment of an interface displaying a document.

It may be useful to briefly give an example of an interface that may be utilized by embodiments. FIG. 10A depicts one embodiment of an interface displaying a document where the user may have the ability to request that reusable resources for content types be extracted from the document FIG. 10B depicts the resulting reusable resources and associated content and metadata that may be returned to the user in response to the request and displayed in a user interface of a document authoring application and which may be utilized by a user in document authoring.

Those skilled in the relevant art will appreciate that the invention can be implemented or practiced with other computer system configurations including, without limitation, multi-processor systems, network devices, mini-computers, mainframe computers, data processors, and the like. The invention can be embodied in a general-purpose computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet.

In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

APPENDIX A

REUSABLE_RESOURCE:
Int ID
CONTENT_TYPE contentType,
String content,
MetaData

MetaData:
Coordinate,
String fontType,
String Size
Coordinate
int xMin,
int yMin,
int xMax,
int yMax
Enum: CONTENT_TYPE
HEADER
FOOTER
DOCUMENT_TITLE
DATE
EMAIL
SIGNATURE

What is claimed is:

1. A system, comprising:
a processor; and
a non-transitory computer readable medium, comprising instructions for:
accessing a set of reusable objects stored at a document authoring server; and authoring a document in one of a plurality of diverse document authoring tools using the accessed set of reusable objects, wherein:
each of the reusable objects is an instance of a content type object representing a content type mapped to a corresponding reusable resource and including metadata and content of the reusable resource as previously extracted from another document, the reusable resource identified as reusable for the plurality of diverse document authoring tools.

2. The system of claim 1, wherein the content type of the corresponding reusable resource comprises a content type object in a content type format that is common across the plurality of diverse document authoring tools.

3. The system of claim 1, wherein the previously extracted metadata and content of the reusable resource comprise previously extracted metadata and content previously processed independently to identify reusable resources of each content type of a plurality of content types.

4. The system of claim 1, wherein authoring the document comprises:
obtaining a definition of the document that includes an identification of the corresponding reusable resource; and
populating the document using the reusable resource object associated with the reusable resource identified in the definition, wherein the authored document includes the content of the associated reusable resource object.

5. The system of claim 1, wherein each of the reusable objects is in an associated content type format common to the plurality of document authoring tools.

6. The system of claim 1, wherein the set of content types comprises one or more of: a header, a footer, a document title, a date, an email, or a signature.

7. The system of claim 1, wherein the metadata includes location information for the reusable resource in the other document.

8. A method, comprising:
accessing a set of reusable objects stored at a document authoring server; and
authoring a document in one of a plurality of diverse document authoring tools using the accessed set of reusable objects, wherein:
each of the reusable objects is an instance of a content type object representing a content type mapped to a corresponding reusable resource and including metadata and content of the reusable resource as previously extracted from an other document, the reusable resource identified as reusable for the plurality of diverse document authoring tools.

9. The method of claim 8, wherein the content type of the corresponding reusable resource comprises a content type object in a content type format that is common across the plurality of diverse document authoring tools.

10. The method of claim 8, wherein the previously extracted metadata and content of the reusable resource comprise previously extracted metadata and content previously processed independently to identify reusable resources of each content type of a plurality of content types.

11. The method of claim 8, wherein authoring the document comprises:
obtaining a definition of the document that includes an identification of the corresponding reusable resource; and
populating the document using the reusable resource object associated with the reusable resource identified in the definition, wherein the authored document includes the content of the associated reusable resource object.

12. The method of claim 8, wherein each of the reusable objects is in an associated content type format common to the plurality of document authoring tools.

13. The method of claim 8, wherein the set of content types comprises one or more of: a header, a footer, a document title, a date, an email, or a signature.

14. The method of claim 8, wherein the metadata includes location information for the reusable resource in the other document.

15. A non-transitory computer readable medium, comprising instructions for:
accessing a set of reusable objects stored at a document authoring server; and
authoring a document in one of a plurality of diverse document authoring tools using the accessed set of reusable objects, wherein:
each of the reusable objects is an instance of a content type object representing a content type mapped to a corresponding reusable resource and including metadata and content of the reusable resource as previously extracted from an other document, the reusable resource identified as reusable for the plurality of diverse document authoring tools.

16. The non-transitory computer readable medium of claim 15, wherein the content type of the corresponding reusable resource comprises a content type object in a content type format that is common across the plurality of diverse document authoring tools.

17. The non-transitory computer readable medium of claim 15, wherein the previously extracted metadata and content of the reusable resource comprise previously extracted metadata and content previously processed independently to identify reusable resources of each content type of a plurality of content types.

18. The non-transitory computer readable medium of claim 15, wherein authoring the document comprises:
obtaining a definition of the document that includes an identification of the corresponding reusable resource; and
populating the document using the reusable resource object associated with the reusable resource identified in the definition, wherein the authored document includes the content of the associated reusable resource object.

19. The non-transitory computer readable medium of claim 15, wherein each of the reusable objects is in an associated content type format common to the plurality of document authoring tools.

20. The non-transitory computer readable medium of claim 15, wherein the set of content types comprises one or more of: a header, a footer, a document title, a date, an email, or a signature.

21. The non-transitory computer readable medium of claim 15, wherein the metadata includes location information for the reusable resource in the other document.

\* \* \* \* \*